| United States Patent [19] | [11] 3,940,537 |
|---|---|
| Burns | [45] Feb. 24, 1976 |

[54] FIBROUS MATS

[75] Inventor: Joseph P. Burns, Wilmington, Del.

[73] Assignee: ICI United States Inc., Wilmington, Del.

[22] Filed: July 12, 1973

[21] Appl. No.: 378,442

[52] U.S. Cl. ............... 428/288; 156/330; 156/335; 260/836; 260/837 PV; 260/853; 260/856; 428/198; 428/290; 428/417; 428/426; 428/442; 428/436

[51] Int. Cl.². ... D04H 1/58; B32B 5/16; D04H 1/60

[58] Field of Search ........... 161/170, 185, 203, 204, 161/192; 117/126 GB, 126 GE; 260/837 PV, 837 R, 853, 856; 428/198, 288, 290, 361, 417, 441, 442, 426, 436; 156/330, 335

[56] References Cited
UNITED STATES PATENTS

| | | | |
|---|---|---|---|
| 2,550,465 | 4/1951 | Gorski | 161/170 |
| 2,604,464 | 7/1952 | Segall | 260/837 |
| 3,074,834 | 1/1963 | Matlin | 161/170 |
| 3,157,562 | 11/1964 | Kine | 161/170 |
| 3,373,075 | 3/1968 | Fekete | 161/185 |
| 3,381,054 | 4/1968 | Blanc | 161/170 X |
| 3,776,810 | 12/1973 | Kelley | 161/170 |

FOREIGN PATENTS OR APPLICATIONS

| | | | |
|---|---|---|---|
| 868,335 | 5/1961 | United Kingdom | 161/170 |
| 867,545 | 5/1961 | United Kingdom | 161/170 |

*Primary Examiner*—George F. Lesmes
*Assistant Examiner*—Ellis P. Robinson

[57] ABSTRACT

Fibrous mats which are insoluble in styrene are disclosed. The mats comprise a fibrous material and a binder resin which is the reaction product of
(a) a first monomer selected from the group consisting of styrene, lower alkyl acrylates, lower alkyl methacrylates, lower alkyl itaconates, lower alkyl maleates, lower alkyl fumarates, vinyl esters, and vinyl chloride;
(b) a second monomer selected from the group consisting of acrylic acid, methacrylic acid, itaconic acid, maleic acid, fumaric acid, acrylamide, lower alkyl acrylamides, N-alkoxy modified acrylamides, diacetone acrylamide, maleamic acid, meleamide, furamide, N-monoalkyl/aryl substituted amides, hydroxyethyl acrylate, and hydroxypropyl methacrylate; and
(c) a modifier selected from the group consisting of epoxy resins, melamine formaldehyde resins, and urea formaldehyde resins.

8 Claims, No Drawings

FIBROUS MATS

BACKGROUND OF THE INVENTION

1. Field of the Invention

The present invention relates generally to styrene insoluble fibrous mats and to a method of preparing said mats. More particularly, the invention relates to fibrous mats comprising a fibrous material and a binder resin, said resin comprising
   a. a first alpha-beta ethylenically unsaturated monomer selected from the group consisting of styrene, lower alkyl acrylates, lower alkyl methacrylates, lower alkyl itaconates, lower alkyl maleates, lower alkyl fumarates, vinyl esters, and vinyl chloride;
   b. a second alpha-beta ethylenically unsaturated monomer selected from the group consisting of acrylic acid, methacrylic acid, itaconic acid, maleic acid, fumaric acid, acrylamide, lower alkyl acrylamides, N-alkoxy modified acrylamides, diacetone acrylamide, maleamic acid, maleamide, furamide, N-monoalkyl/aryl substituted amides, hydroxyethyl acrylate, and hydroxypropyl methacrylate; and
   c. a modifier selected from the group consisting of epoxy resins, melamine formaldehyde resins, and urea formaldehyde resins.

The mats are prepared by combining the fibrous material and binder resin and heating at a mat temperature of at least about 150°C. for a time sufficient to cure the resin to an insoluble state.

2. Description of the Prior Art

Fiber reinforced plastics, such as glass reinforced materials, are well known in the art. These materials are generally prepared by combining fibers in the form of a continuous layer or mat with a suitable resinous composition. The resinous compositions most frequently employed comprise a polyester resin and a vinyl monomer. Of the numerous vinyl monomers which may be employed in the resinous compositions, styrene is most generally used because of its availability and low cost.

Fibrous mats for use in producing these reinforced materials are also known and can be produced in any one of several ways. In the production of said mats, it is important that the fibers therein be bonded to one another at points of contact by a relatively flexible binder, so that such a mat can be handled and fitted to the contours of a mold in which a fiber reinforced plastic is to be produced without substantial disruption of the mat. Accordingly, a mat binder must be capable of adhering glass fibers to one another and must be sufficiently flexible so that the mat can be handled and shaped as required prior to the time that a reinforced plastic is produced therefrom.

After a glass fiber mat has been packed into a suitable mold, a suitable, curable resinous composition is then associated therewith in the mold; and the molding operation, which may involve heat and pressure, is carried out. The molding operation may be matched die compression molding, hand lay-up molding, vacuum bag molding, or another process known to those skilled in the art. To be suitable for use in this part of the operation, the mat binder must be compatible with the resinous composition and, preferably, be copolymerizable therewith.

Mat binder resins which have relatively fast solubility rates in the vinyl monomers employed in the resinous compositions utilized in the preparation of said reinforced plastics are used principally in the preparation of mats which are utilized in low pressure molding operations. In the low pressure operations, there is only a slight tendency for the bonded fibrous material to be displaced and it is, therefore, permissible for the binder resin to dissolve fairly rapidly in the vinyl monomer component of the resinous composition since it is not necessary for the binder resin to maintain the bonded fibers in a set position for a prolonged period of time.

However, in high pressure operations, there is a greater tendency for the bonded fibrous material to become displaced resulting in a product in which the fibers are unevenly distributed. This is undesirable for a variety of reasons and it is, therefore, essential that the binder resin employed in a mat which is to be used in this type of operation be capable of holding the fibrous material firmly in place. To do this, the mat binder resin must have a relatively slow solubility rate in the vinyl monomer component of the resinous composition.

Previously, the classification of a bonded mat as either of the soluble or insoluble type was determined by the nature of the resin employed in the preparation of said mat. Thus, it was possible to produce a mat having the desired solubility properties by carefully selecting the binder resin employed in said mat. See, in this regard, U.S. Pat. No. 3,340,136 issued to Burns et al.

However, it would be desirable to be able to utilize a single binder resin in the preparation of either soluble or insoluble fibrous mats. In accordance with the present invention, it has been found that certain resins, as hereinafter defined, may be utilized in the preparation of insoluble mats by carefully controlling the conditions under which said mats are cured. Operating outside these conditions, the same resins are useful in the preparation of soluble fibrous mats.

SUMMARY OF THE INVENTION

In accordance with the present invention, it has been found that styrene insoluble fibrous mats may be prepared by heating for an extended period of time a mat which would otherwise be soluble in styrene. This result is achieved by the use in said mat of a binder resin selected from a particular class of resins as is hereinafter defined.

DESCRIPTION OF THE PREFERRED EMBODIMENTS

As mentioned above, the present invention relates to styrene insoluble fibrous mats comprising a fibrous material and a binder resin.

Any fibrous material conventionally employed in the preparation of bonded mats may be utilized in accordance with the present invention. Representative materials include, for example, glass; glass wool; natural fibers such as cellulose, silk, wool, and cotton; and synthetic fibers such as polyamides, polyesters, polyolefins, and vinyl polymers. Of these, it is especially preferred to employ glass fibers in the preparation of the insoluble mats of the present invention.

In preparing the improved mats of the present invention, the fibrous mat is prepared in a conventional manner as is well known to those skilled in the art. The resin may be introduced into the mat during the formation thereof or deposited in the mat subsequent to its formation. The resin may be deposited in the mat by drawing the mat through a chamber in which a suspension of the powdered resin is maintained by turbulent air flow or spraying the mat with a latex containing the resin.

As mentioned above, the resins which are employed in the styrene insoluble fibrous mats of the present invention comprise the reaction product of
a. a first alpha-beta ethylenically unsaturated monomer, sometimes referred to hereinafter as the main monomer;
b. a second alpha-beta ethylenically unsaturated monomer, sometimes referred to hereinafter as the reactive monomer; and
c. a modifier.

Each of these components is described in detail below.

The first alpha-beta ethylenically unsaturated monomer is selected from the group consisting of styrene, vinyl esters, vinyl chloride, lower alkyl methacrylates, lower alkyl acrylates, lower alkyl itaconates, lower alkyl maleates, and lower alkyl fumarates. As used herein, the term lower alkyl refers to alkyl groups containing from 1 to about 4 carbon atoms. Vinyl esters which may be utilized include, for example, vinyl acetate, vinyl butyrate, vinyl 2-ethyl hexoate, vinyl propionate, and vinyl stearate.

Preferred main monomers include styrene and methyl methacrylate. When more than one monomer is present as the main monomer, the preferred monomer combinations are styrene/butyl acrylate, methyl methacrylate/butyl acrylate, styrene/butyl methacrylate, and methyl methacrylate/styrene/butyl acrylate.

The second alpha-beta ethylenically unsaturated monomer is selected from the group consisting of acrylic acid, methacrylic acid, itaconic acid, maleic acid, fumaric acidm acrylamide, lower alkyl acrylamides, N-alkoxy modified acrylamides such as N-hydroxymethyl acrylamide and N-butoxymethyl acrylamide, diacetone acrylamide, maleamic acid, maleamide, furamide, N-monoalkyl/aryl substituted amides, hydroxyethyl acrylate, and hydroxypropyl methacrylate. The preferred reactive monomer is methacrylic acid. Here, also, combinations of two or more reactive monomers may also be utilized.

The modifier is selected from the group consisting of epoxy resins, melamine formaldehyde resins, and urea formaldehyde resins. As used herein, epoxy resins refers to those materials containing a reactive epoxide

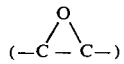

group. Representative epoxy resins which may be employed include, for example, "Cardura" E, available from Shell Chemical Company, which is a glycidyl ester produced by reaction of epichlorohydrin and a mixture of saturated, highly branched, mainly tertiary monocarboxylic acids having a $c_9$, $C_{10}$, and $C_{11}$ chain length ("Versatic" acid); "Genepoxy" M205 which is a modified diglycidyl ether of bisphenol A, available from General Mills Inc.; "Epon" 812 which is a diglycidyl ether of glycerol, available from Shell Chemical Company; "Epon" 826 which is substantially pure diglycidyl ether of bisphenol A, also available from Shell Chemical Company; and "Epon" 828 which is a slightly resinified form of "Epon" 826, available from Shell Chemical Company.

Melamine formaldehyde resins refers to those materials which are well known in the art and are prepared by reacting melamine with formaldehyde. Modified melamine formaldehyde resins such as the alkylated melamine formaldehyde resins including butylated melamine formaldehyde resins may also be employed in the preparation of the resins utilized in accordance with the present invention. Representative melamine formaldehyde resins which may be employed include, for example, such commercially available resins as "Cymel" 300, "Cymel" 301, and "Cymel" 303, all of which are available from American Cyanamid Company; "Uformite" MM83, available from Rohm & Haas Company; and "Resimene" 740, available from Monsanto Company.

Similarly, urea formaldehyde resins include those materials which are well known in the art and are prepared by reacting urea and formaldehyde. Substituted urea formaldehyde resins such as alkylated urea formaldehyde resins may also be employed in accordance with the present invention.

Of the above materials, it is preferred to employ an epoxy resin as the modifier in the preparation of the binder resins useful in accordance with the present invention.

The amounts of the various components utilized in the binder resins of the present invention may be varied over a wide range. Preferred results are achieved with resins containing a modifier in an amount equal to from about 1% to about 15% by weight based on the weight of total solids, a reactive monomer in an amount equal to from about 1% to about 10% by weight based on the weight of total solids, and a main monomer in an amount equal to from about 75% to about 98% by weight based on the weight of total solids.

In preparing the materials useful as binder resins in the present invention, there may be utilized various surface active agents, suspension agents, or mixtures thereof. Representative surface active agents which may be employed include, for example, "Benax" 2 Al, sodium dodecyl diphenyl ether disulphonate, available from Dow Chemical Company; "Ingepal" CO 730, nonyl phenoxypoly(ethyl-enoxy 15)ethanol, available from General Aniline and Film Corporation; "Igepon" T 77, sodium N-methyl-N-oleoyllaurate, also available from General Aniline and Film Corporation; "Aerosol" TR, the bis(tridecyl) ester of sodium sulphosuccinic acid, available from American Cyanamid Company; "Triton" X-200, sodium alkylaryl polyether sulphonate (28% solids solution), available from Rohm & Haas Company; "Sipon" WD, sodium lauryl sulphate, and "Siponate" DS-10, sodium dodecyl benzene sulphonate, both of which are available from Alcolac Chemical Corporation.

Representative suspension agents include, for example, small quantities of water soluble polymers, e.g., partially hydrolyzed polyvinyl acetate, and/or small amounts of water insoluble inorganic salts such as trisodium phosphate.

Conventional polymerization initiators may also be employed. For example, persulphates, hydrogen peroxide, perborates, peroxides, hydroperoxides, and azo compounds soluble in the monomers or in water with convenient radical forming reactions rates, including redox systems, can be used.

The binder resins useful in the present invention are prepared by known emulsion polymerization techniques. Preferred methods for preparing the binder resins include the following four procedures:

In the first process, the monomers, modifier, a portion of the surface active substance, and a portion of the water are emulsified by vigorous agitation. These are slowly charged to the reaction vessel which contains all of the other components. The addition of the emulsion may continue for as long as 6 to 8 hours depending on the solubilities of the monomers and modifier. Agitation of the emulsion may be continued over the time of addition if necessary.

In the second method, all of the water soluble components of the system and water are charged to the reaction vessel and the monomer or monomers and modifier are added over a period of several hours. This time of addition is, of course, dependent on the solubilities of the various components.

In the third method, all of the soluble components, the modifier, and the water are charged to the reaction vessel and the monomer or monomers are added over a period of several hours. Again, the addition time depends on the solubilities of the monomer or monomers.

In the final preferred method, some of the surface active agent, polymerization initiator, and water are charged to a vessel and heated; and an emulsion of all of the remaining ingredients is added over a period of several hours.

The polymer dispersions described above may be used as such in the preparation of fibrous mats or they may be converted to dry particulate form by removing the water by known means, e.g., by evaporation carried out under reduced pressure, spray during or fluidized bed techniques. The polymer particles may also be separated from the water by centrifuge and then allowed to dry. These powders may also be used as binder resins in preparing the styrene insoluble fibrous mats of the present invention. However, when powder forms of the resins are employed, it is essential that the size of the particles be such that the particles are retained by the fibrous mat during preparation thereof.

The amount of binder resin employed should be sufficient to bind the fibrous material together. Preferred results are achieved with an amount of binder resin equal to from about 3% to about 8% by weight based on the total weight of said mat.

Catalysts to accelerate the curing reaction may be included in the resin compositions useful in the present invention.

When a catalyst is employed, it has been found that the time required to cure the mat to an insoluble state is reduced.

Representative catalysts which may be utilized include, for example, amines, such as diethanolamine, dimethylethanolamine, di-n-propyl amine, ethylene diamine, hexane diamine, isophorone diamine, triethanol amine, tetraethylene pentamine, and trimethyl hexane diamine; and metal-amine complexes, such as zinc bis(dimethylethanol-amine) acetate. Other types of catalysts include copolymerized acids and external acids, usually strong inorganic or organic acids having a pK>4. Latent catalysts may also be used, such as the morpholine salt of p-toluene sulphonic acid. Of these, it is preferred to employ dimethylethanol amine. The amount of catalyst may also be varied over a wide range and the actual amount employed depends upon the results desired. Preferred results have been achieved with an amount of catalyst equal to from about 0.5% to about 1.0% by weight based on the weight of the resin solids utilized. If less than about 0.5% is employed, it has been found that the resulting compositions are not significantly different from the uncatalyzed compositions to make the use of a catalyst desirable. Similarly, if above about 1.0% catalyst is employed, no further advantage is noted in the curing of the compositions and it is, therefore, not preferred to include additional catalyst. However, either more or less than the above amounts of catalyst may be utilized within the scope of the present invention.

After the mat comprising the fibrous material and binder resin is prepared, the mat is heated resulting in the preparation of a styrene insoluble bonded fibrous mat. The actual conditions employed in the curing operation may be varied depending upon the drying apparatus employed and the degree of styrene insolubility desired in the final product. What is essential in the drying operation is that all of the water, if a latex is used, must first be removed from the mat and the resin then cured to an insoluble state. For most applications, the desired degree of insolubility can be achieved by heating the mat to a temperature of at least about 150°C. The actual time required in the heating operation is that which is sufficient to cure the resin to the desired state. The following table indicates the relationship between the temperature of the mat and the time which is required at that temperature to produce a styrene insoluble mat when no catalyst is employed. If a catalyst is added these times may be reduced.

| Mat Temperature | Time |
| --- | --- |
| 150°C. | 96 minutes |
| 175°C. | 18 minutes |
| 200°C. | 3 minutes |
| 225°C. | 33 seconds |
| 250°C. | 5 seconds |

In connection with the above table, it should be noted that the temperatures given are the temperatures of the mat itself and not of the oven in which the mat is cured. In this way, the present invention can be defined independently of the actual drying apparatus employed since differences in various ovens are attributable primarily to the time required to, first, remove water from the mat and, subsequently, raise the temperature of the mat to the desired level.

In the preparation of styrene insoluble fibrous mats of the present invention, preferred results are achieved when the mat is cured by heating the mat to a temperature of from about 175°C. to about 225°C. and maintaining the mat at that temperature for from about 33 seconds to about 18 minutes. Especially preferred results are achieved when the mat is maintained at a temperature of at least about 200°C. for a period of time equal to at least about 3 minutes. As will be appreciated by those skilled in the art, the mat may be cured for times longer than those indicated above. However, once the mat has become insoluble, no further advantage is achieved by prolonged heating and extended times are, therefore, not preferred.

The fibrous mats of the present invention are insoluble in styrene. As used herein, the term "styrene insoluble" refers to a mat which maintains its integrity for at least 10 minutes when suspended in styrene. Styrene solubility is determined in accordance with the following procedure:

A 14 inch × 14 inch mat is prepared from 60 grams of fibrous material. A binder resin in amount equal to from about 3% to about 8% by weight based on the total weight of the mat is included in said mat and cured by heating a forced draft oven maintained at 200°C. for a total time of 25 minutes. This included the time required to remove water from the mat (about 10–12 minutes) and the time required to raise the temperature of the mat to 200°C. (about 10 minutes) as well as the time the mat is maintained at about 200°C. (about 3 minutes). The solubility of the mat is determined by suspending a 4 inch × 5 inch section of the above prepared mat in a styrene bath at 25°C. A 100-gram clip is attached to the section and the length of time the mat supports the weight while submerged in the bath is measured as an indication of the solubility rate in styrene. Styrene insoluble mats are those which will support the weight for at least 10 minutes.

The sytrene insoluble fibrous mats of the present invention are useful in the preparation of fiber reinforced plastics. These materials are prepared utilizing the mats of this invention by methods which are known in the art for preparing said plastics.

In order to describe the present invention so that it may be more clearly understood, the following examples are set forth. These examples are set forth primarily for the purpose of illustration and any specific enumeration of detail contained therein should not be interpreted as a limitation on the concept of the present invention.

EXAMPLE 1

Into a 5-liter flask, there was added a first charge comprising:
  7.07 grams of Benax 2Al,
  2.36 grams of Igepal CO 730,
  353.70 grams of water, and
  3.54 grams of sodium bicarbonate.
A second charge was prepared by dissolving
  33.01 grams of Benax 2A1 and
  10.02 grams of Igepal CO 730
in a mixture of
  1,650.6 grams of styrene,
  117.9 grams of methacrylic acid, and
  117.9 grams of Epon 826
and adding to the resulting solution a dispersion of
  3.54 grams of sodium persulfate in
  1,697.80 grams of water.

The first charge was heated to 85°C. and there was then added 3.54 grams of sodium persulfate followed by the second charge which was added over a period of 5.5 hours while maintaining the temperature of the reaction mixture at from 83°C. to 85°C. The mixture was cooled to room temperature and allowed to stand for 64 hours. At the end of this time, the reaction mixture was heated to 80°C. and there was added thereto
  1.5 grams of sodium hydrosulfite,
  15.0 grams of water, and
  6.0 ml. of t-butyl hydroperoxide. The reaction mixture was maintained at 80°C. for 45 minutes at the end of which time it was cooled resulting in a latex having a pH of 5.0 and a solids content of 48.0%.

EXAMPLE 2

A sample of the resin prepared in Example 1 was diluted with water to a resin solids content of 4.5% by weight. This material was evaluated as a fibrous mat binder in the following manner.

In a laboratory scale mat making machine, 4 successive 15-gram layers of 2-inch chopped glass fibers were sprayed with 25-gram portions of the 4.5% resin solids latex. No air blowing was used in this operation. The glass mat was removed and heated for 30 minutes in a forced draft oven maintained at 200°C. The oven employed was an Aminco Model No. 4-3520 available from American Instrument Company, Silver Springs, Md. The mat was then cooled between 2 Teflon plates and cut into sections for testing.

When tested, the mat had the following properties:

| | |
|---|---|
| Styrene solubility | over 20 minutes |
| Tensile strength | 7.1 pounds/inch |
| Fold tensile strength | 3.7 pounds/inch |
| Tensile retention | 52% |

In the examples, the following standard tests were employed:

The styrene solubility of the mats was determined by suspending a 4 inch × 5 inch section of the mat in a styrene bath at 25°C. A 100-gram clip was attached to the mat and the length of time that the mat supported the weight while submerged in the bath was measured as an indication of the resin solubility rate in styrene. Thus, a material having a styrene solubility of 30 seconds would indicate that the mat disintegrated in the above test in a period of 30 seconds. As mentioned above, the styrene insoluble mats of the present invention are those which have styrene solubility values equal to at least about 10 minutes.

Tensile strength, fold tensile strength, and tensile retention were determined by mounting a 3 inch × 5 inch section of the mat along the 3 inch dimension in the jaws of a tensile testing machine (a Tinius Olsen 30,000-pound capacity Electromatic Universal Testing Machine) with 1 inch of the sample in each jaw of the tester, leaving a 3 inch × 3 inch area of the mat visible. The force necessary to tear the mat apart was recorded as tensile strength. Because of the difficulty in measuring the thickness of the mat, the tensile strength is arbitrarily expressed in pound per inch. The fold tensile strength was determined in a similar manner after a 3 inch × 5 inch sample had been folded 180° at the center line of the long dimension. The piece was then returned to its normal position and the tensile strength measured as described above. The tensile retention refers to the ratio of fold tensile strength to the initial tensile strength expressed in percent and is an indication of the brittleness of the binder resin and the handability of the mat during subsequent operations. The actual values given in the examples are averages based on 6 samples.

EXAMPLE 3

To the resin solution containing 4.5% by weight resin solids, described in Example 2, there was added 1% by weight based on the weight of resin solids of dimethylethanolamine. Employing the procedure described in Example 2, fibrous mats were prepared utilizing this resin composition and heated fro 20 minutes in the oven described in Example 2.

The resulting mats had the following properties:

| | |
|---|---|
| Styrene solubility | over 60 minutes |
| Tensile strength | 7.25 pounds/inch |
| Fold tensile strength | 4.42 pounds/inch |
| Tensile retention | 61% |

EXAMPLE 4

A second mat, prepared as described in Example 2, was cured by heating in the oven described in Example 2 at 200°C. for 25 minutes. The resulting mat had a styrene solubility equal to greater than 30 minutes.

EXAMPLE 5

To the resin solution containing 4.5% by weight resin solids, described in Example 2, there was added dimethylethanolamine in an amount equal to 0.5% by weight based on the weight of resin solids in said solution.

A fiberglass bonded mat was prepared, as described in Example 2, utilizing the resulting resin composition. The mat was cured by heating in a 200°C. oven for 22 minutes. The resulting mat had a styrene solubility equal to greater than 30 minutes. A second sample of the mat was cured by heating in the oven for 25 minutes. This sample also had a styrene solubility equal to greater than 30 minutes. A third sample of the mat, cured for 30 minutes, had a styrene solubility equal to greater than 60 minutes. By comparison, a fourth sample of the mat, cured for 20 minutes, had a styrene solubility equal to about 3 minutes.

EXAMPLE 6

To the resin solution containing 4.5% by weight resin solids, described in Example 2, there was added 2.0% by weight based on the weight of resin solids of dimethylethanolamine. A mat was prepared utilizing this resin composition by the procedure described in Example 2. A sample of the mat was cured by heating for 20 minutes in an oven maintained at 200°C. The resulting mat had the following properties:

| | |
|---|---|
| Styrene solubility | greater than 60 minutes |
| Tensile strength | 9.87 pounds/inch |
| Fold tensile strength | 4.62 pounds/inch |
| Tensile strength | 46.8% |

What is claimed is:

1. A styrene insoluble fibrous mat comprising a fibrous material and a binder resin, said resin comprising the single step reaction product of
   a. a first alpha-beta ethylenically unsaturated monomer selected from the group consisting of styrene, vinyl esters, vinyl chloride, lower alkyl methacrylates, lower alkyl acrylates, lower alkyl itaconates, lower alkyl maleates, and lower alkyl fumarates;
   b. a second alpha-beta ethylenically unsaturated monomer selected from the group consisting of acrylic acid, methacrylic acid, itaconic acid, maleic acid, fumaric acid, maleamic acid, maleamide, furamide, N-monoalkyl/aryl substituted amides, hydroxyethyl acrylate, and hydroxypropyl methacrylate; and
   c. a modifier selected from the group consisting of epoxy resins, melamine formaldehyde resins, and urea formaldehyde resins; wherein the amount of binder resin is equal to from about 3 percent to about 8 percent by weight based on the total weight of said mat and said binder resin comprises from about 75% to about 98% by weight of said first monomer, from about 1% to about 10% by weight of said monomer, and from about 1% to about 15% by weight of said modifier.

2. A fibrous mat, as claimed in claim 1, wherein the fibrous material is glass.

3. A fibrous mat, as claimed in claim 1, wherein the binder resin is the reaction product of styrene, methacrylic acid, and an epoxy resin.

4. A method of preparing a styrene insoluble fibrous mat, said method comprising
   a. preparing a mat comprising a fibrous material and a binder resin, wherein the amount of binder resin is equal to from about 3 percent to about 8 percent by weight based on the total weight of said mat, said resin comprising a mixture of
      i. from about 75% to about 98% by weight of a first alpha-beta ethylenically unsaturated monomer selected from the group consisting of styrene, vinyl esters, vinyl chloride, lower alkyl methacrylates, lower alkyl acrylates, lower alkyl itaconates, lower alkyl maleates, and lower alkyl fumarates;
      ii. from about 1% to about 10% by weight of a second alpha-beta ethylenically unsaturated monomer selected from the group consisting of acrylic acid, methacrylic acid, itaconic acid, maleic acid, fumaric acid, maleamic acid, maleamide, furamide, N-monoalkyl/aryl substituted amides, hydroxyethyl acrylate, and hydroxypropyl methacrylate; and
      iii. from about 1% to about 15% by weight of a modifier selected from the group consisting of epoxy resins, melamide formaldehyde resins, and urea formaldehyde resins; and
   b. heating said mat to a temperature of from 150°C. to about 250°C. for a time sufficient to cure said mat to a styrene insoluble state.

5. A method, as claimed in claim 4, wherein the mat is maintained at a temperature of from about 175°C. to about 225°C. for a period of time equal to from about 33 seconds to about 18 minutes.

6. A method, as claimed in claim 4, wherein the mat is maintained at a temperature of at least about 200°C. for a period of time equal to at least about 3 minutes.

7. A method, as claimed in claim 4, wherein the binder resin includes a catalyst to accelerate the curing reaction.

8. A method, as claimed in claim 7, wherein the catalyst is dimethylethanolamine.

* * * * *

UNITED STATES PATENT AND TRADEMARK OFFICE
CERTIFICATE OF CORRECTION

PATENT NO. : 3,940,537
DATED : February 24, 1976
INVENTOR(S) : Joseph P. Burns

It is certified that error appears in the above-identified patent and that said Letters Patent are hereby corrected as shown below:

Column 3, line 56, "c_9," should read -- $C_9$, --.
Column 4, line 39, "'Ingepal'" should read -- "Igepal" --.
Column 5, line 28, "during" should read -- drying --.
Column 6, line 68, last line, before "a" and after "heating" insert -- in --.
Column 10, line 6, before "monomer," and after "said" insert -- second --.

Signed and Sealed this

Tenth Day of April 1979

[SEAL]

Attest:

RUTH C. MASON
Attesting Officer

DONALD W. BANNER
Commissioner of Patents and Trademarks